United States Patent
Kim et al.

(10) Patent No.: US 7,554,902 B2
(45) Date of Patent: Jun. 30, 2009

(54) PREAMBLE DESIGN FOR FREQUENCY OFFSET ESTIMATION AND CHANNEL EQUALIZATION IN BURST OFDM TRANSMISSION SYSTEM

(75) Inventors: Ki-yun Kim, Kwangmyeong-si (KR); Ho Kim, Seoul (KR); Hyung-jin Choi, Seoul (KR)

(73) Assignee: Samsung Thales Co., Ltd., Gumi, Kyungsangbuk-Do (KR)

( * ) Notice: Subject to any disclaimer, the term of this patent is extended or adjusted under 35 U.S.C. 154(b) by 959 days.

(21) Appl. No.: 10/420,693

(22) Filed: Apr. 23, 2003

(65) Prior Publication Data
US 2004/0042385 A1 Mar. 4, 2004

(30) Foreign Application Priority Data
Aug. 31, 2002 (KR) .................. 10-2002-0052294

(51) Int. Cl.
*H04J 11/00* (2006.01)
(52) U.S. Cl. .................. 370/208; 370/210
(58) Field of Classification Search .......... 370/208, 370/210, 343, 203
See application file for complete search history.

(56) References Cited

U.S. PATENT DOCUMENTS

| | | | |
|---|---|---|---|
| 5,991,289 A | 11/1999 | Huang et al. | |
| 6,035,003 A | 3/2000 | Park et al. | |
| 6,058,101 A | 5/2000 | Huang et al. | |
| 6,160,821 A | 12/2000 | Dölle et al. | |
| 6,198,782 B1 | 3/2001 | De Courville et al. | |
| 6,205,188 B1 | 3/2001 | Stott et al. | |
| 6,414,936 B1* | 7/2002 | Cho et al. | 370/208 |
| 6,442,211 B1 | 8/2002 | Hampel et al. | |
| 6,714,511 B1* | 3/2004 | Sudo et al. | 370/208 |
| 7,012,881 B2* | 3/2006 | Kim | 370/208 |
| 2002/0034161 A1 | 3/2002 | Deneire et al. | |
| 2002/0126618 A1* | 9/2002 | Kim | 370/208 |
| 2002/0145971 A1* | 10/2002 | Cho et al. | 370/208 |
| 2003/0072256 A1* | 4/2003 | Kim | 370/208 |

* cited by examiner

*Primary Examiner*—Kwang B Yao
*Assistant Examiner*—Andrew Lai
(74) *Attorney, Agent, or Firm*—Robert E. Bushnell, Esq.

(57) ABSTRACT

Provided is a transmission data frame in an orthogonal frequency division multiplexing (OFDM) burst mode transmission, and more particularly, a frequency offset estimating method and a channel equalizing method using a transmission data frame. In the transmission data frame used in the orthogonal frequency division multiplexing burst mode transmission, a length of a guard interval in a preamble area for frequency offset estimation and channel estimation varies depending on a channel environment not being limited in consideration of a size of a data symbol, and only data of ending part of the guard interval in the preamble is used to estimate frequency offset in consideration of intersymbol interference. In the frequency offset estimating method, desired frequency estimation efficiency can be satisfied with the small number of samples. Also, when channel equalization is performed, two symbols are averaged in a time area to reduce the accuracy of channel estimation due to Gaussian random noise. In a frequency area, by referring to weight placed on an adjacent subcarrier, a channel equalization coefficient is obtained to efficiently reduce Gaussian random noise.

34 Claims, 9 Drawing Sheets

PREAMBLE DESIGN FOR FREQUENCY OFFSET ESTIMATION AND CHANNEL EQUALIZATION IN BURST OFDM TRANSMISSION SYSTEM

CLAIM OF PRIORITY

This application makes reference to, incorporates the same herein, and claims all benefits accruing under 35 U.S.C. §119 from an application for PREAMBLE DESIGN FOR FREQUENCY OFFSET ESTIMATION AND CHANNEL EQUALIZATION IN BURST OFDM TRANSMISSION SYSTEM earlier filed in the Korean Intellectual Property Office on 31 Aug. 2002 and there duly assigned Serial No. 2002-52294.

BACKGROUND OF THE INVENTION

1. Field of the Invention

The present invention relates to a transmission data frame in an orthogonal frequency division multiplexing (OFDM) burst mode transmission, and more particularly, to a frequency offset estimating method and a channel equalizing method using a transmission data frame.

2. Description of the Related Art

An orthogonal frequency division multiplexing (OFDM) method, which is a kind of modulation and demodulation methods having several carriers, is a modulation and demodulation method displaying a high efficiency in an environment affected by multi-path interference or a mobile reception environment affected by fading.

Figure 1:
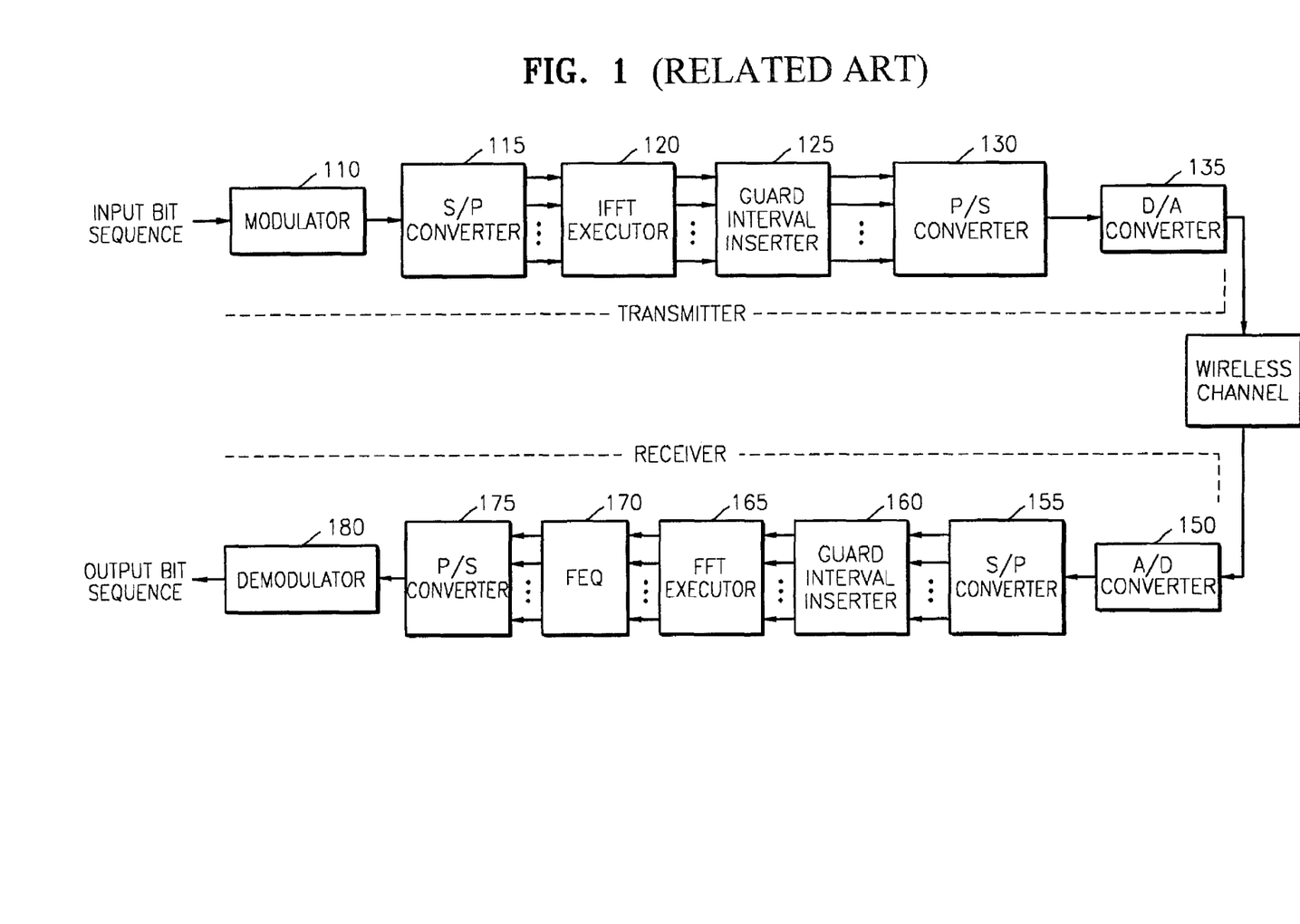
FIG. 1 is a block diagram illustrating an orthogonal frequency division multiplexing (OFMD) method.

FIG. 1 is a block diagram illustrating an orthogonal frequency division multiplexing (OFDM) method. Referring to FIG. 1, in a transmitter, first, a modulator 110 modulates an input bit sequence. Next, a serial/parallel (S/P) converter 115 converts the input bit sequence to parallel data, and then transmits the parallel data to a digital/analog (D/A) converter 135 via an inverse fast Fourier transform (IFFT) executor 120, a guard interval inserter 125, and a parallel/serial (P/S) converter 130. Finally, the D/A converter 135 converts the parallel data to an analog signal, and then transmits the analog signal through a wireless channel.

The process performed in the transmitter is reversely performed in a receiver. The receiver includes an analog/digital (A/D) converter 150, a S/P converter 155, a guard interval remover 160, a FFT (fast Fourier transform) executer 165, a frequency domain equalizer (FEQ) 170, a P/S converter 175, and a demodulator 180.

The OFDM method uses a relatively narrow band while transmitting a large amount of data. Thus, the OFDM method has a high bandwidth efficiency and is robust in a multi-path channel environment. As a result, there are increasingly growing interests in designs for communication systems using the OFDM method. Among several researches on the application of an OFDM technique to the communication systems, a research on an OFDM burst mode transmission in indoor and outdoor environments has been briskly in progress.

Unlike a broadcast transmission, the OFDM burst mode transmission refers to the transmission of data in a predetermined short time. Also, in the OFDM burst mode transmission, fast and accurate frequency offset estimation and channel equalization should be first performed in a preamble area of a transmission data frame.

Frequency offset represents a frequency difference generated by an oscillator of a transceiver. Although the oscillator is highly sophisticated, an error occurs depending on a channel environment. Thus, the frequency estimation refers to the precise detection of the frequency difference. Also, the channel equalization refers to the compensation for the distortion of a signal received in a multi-channel environment.

Further, in the OFDM method, it is simple to realize an equalizer. The reason is why it is possible to realize the equalizer by using only a single tap, unlike a carrier system requiring several tens of taps. If a length of a guard interval (GI) is longer than the maximum path delay of a multi-path, since orthogonality of a sample sequence input to a FFT is maintained, intersymbol interference (ISI) and intercarrier interference (ICI) can be avoided.

Moreover, OFDM equalizers suitable for various channel environments have been recently disclosed. A pre-FFT equalizer in which equalization is carried out in a time area and a frequency area displays a good efficiency although the GI is short or even though there is no GI. However, when the pre-FFT equalizer is realized, many taps are required in the time area. Thus, the pre-FFT becomes very complicated.

SUMMARY OF THE INVENTION

To solve the above-described and other problems, it is an object of the present invention to provide a frequency estimating method by which a length of a guard interval of a symbol for frequency estimation and channel estimation can be set to be suitable for a channel environment irrespective of a guard interval of a data symbol so that a better efficiency can be achieved and a simple structure can be realized, and a preamble structure used for the frequency estimating method.

It is another object of the present invention to provide an equalizing method by which the inaccuracy of channel estimation due to Additive White Gaussian Noise (AWGN) can be reduced by a zero forcing equalization technique used as an OFDM equalization method because of its simple realization.

It is yet another object to have desired frequency estimation efficiency be satisfied with the small number of samples in an orthogonal frequency division multiplexing (OFDM) burst mode transmission.

Accordingly, to achieve the above and other objects, there is provided a method of estimating frequency offset in an orthogonal frequency division multiplexing system. Normalized frequency offset is calculated for each of a known experimental sample signal in which a correlative distance is the number N of subcarriers and a known experimental sample signal in which a correlative distance is two times 2N the number of subcarriers. A predetermined value is subtracted from or added to normalized frequency offset calculated when the correlative distance is 2N, within a range of a normalized frequency offset value calculated when the correlative distance is N so as to estimate the frequency offset.

To achieve the above and other objects, there is provided a method of equalizing a channel in an orthogonal frequency division multiplexing system. Two signals, which are transmitted in the same known pattern and received via a wireless channel, are averaged in a time area to obtain an average value. A channel coefficient is calculated by performing FFT for the obtained average value.

To achieve the above and other objects, there is provided a transmission data frame structure used in an orthogonal frequency division multiplexing burst mode system. In the transmission data frame structure, a length of a guard interval in a preamble area for frequency offset estimation and channel estimation varies depending on a channel environment not being limited in consideration of a size of a data symbol, and only data of ending part of the guard interval in the preamble is used to estimate frequency offset in consideration of intersymbol interference.

To achieve the above and other objects, there is provided a computer-readable recording medium in which a program for executing a frequency offset estimating method performed in an orthogonal frequency division multiplexing system in a computer is recorded. In the frequency offset estimating method, normalized frequency offset is calculated for each of a known experimental sample signal in which a correlative distance is the number N of subcarriers and a known experimental sample signal in which the correlative distance is two times 2N the number of subcarriers. A predetermined value is subtracted from or added to the normalized frequency offset calculated when the correlative distance is 2N within a range of the normalized frequency offset calculated when the correlative distance is N so as to estimate normalized frequency offset.

To achieve the above and other objects, there is provided a computer-readable recording medium in which a program for executing a channel equalizing method performed in an orthogonal frequency division multiplexing system in a computer is recorded. In the channel equalizing method, two signals, which are transmitted in the same known pattern and received via a wireless channel, are averaged in a time area to obtain an average value. A channel coefficient is calculated by performing FFT for the obtained average value.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Hereinafter, preferred embodiments of the present invention will be now described with reference to the attached drawings.

Figure 2A:
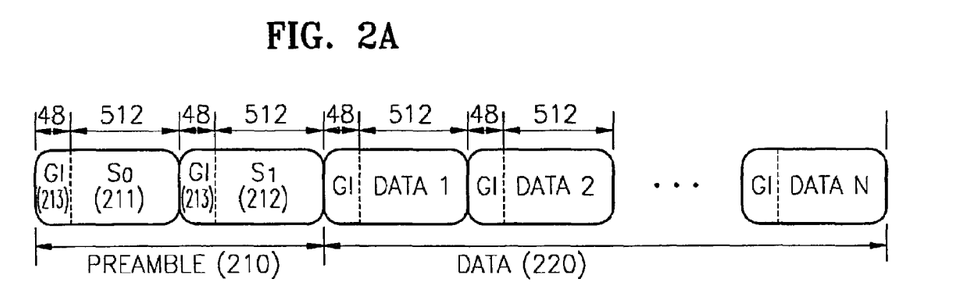
FIG. 2A is a view illustrating a structure of a general transmission data frame used in an OFDM burst mode.

FIG. 2A shows a structure of a conventional transmission data frame used in an orthogonal frequency division multiplexing (OFDM) burst mode. The conventional transmission data frame includes a preamble 210 for frequency offset estimation and a data area 220. The preamble 210 has a $S_0$ 211, a $S_1$ 212, and a guard interval (GI) 213. Here, the $S_0$ 211 and the $S_1$ 212 are known data patterns and the GI 213 is guard interval data.

In general, in OFDM burst mode transmission, after detecting a starting point of a frame, frequency offset of the data area 220 is compensated and the preamble 210 is used to perform channel equalization.

When the frequency offset is estimated to synchronize the frequency, a Doppler frequency or frequency offset generated by a local oscillator of a transceiver greatly affects reception efficiency. In other words, in an OFDM system, the frequency offset destroys the orthogonality between subcarrier signals and makes intercarrier interference (ICI).

Accordingly, it is very important to estimate accurate frequency offset as in a wide frequency band as possible. A conventional frequency offset estimating method calculates the amount of phase rotation between GI data and data in the ending part of a symbol having the same pattern characteristic to estimate the frequency offset.

Figure 2B:
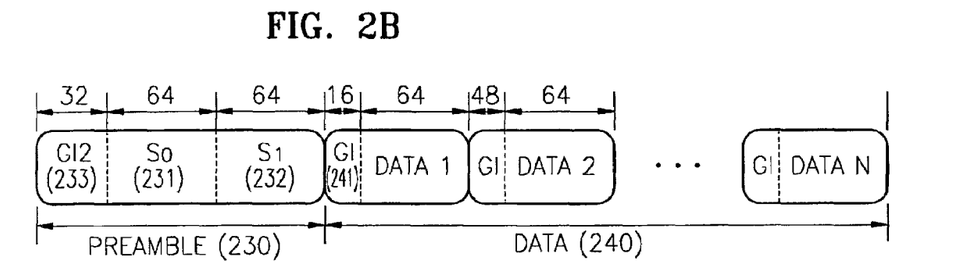
FIG. 2B is a view illustrating a structure of a transmission data frame, according to an IEEE 802.11 a standard, used in the OFDM burst mode.

FIG. 2B shows a structure of a transmission data frame, according to the IEEE 802.11a standard, used in the OFDM burst mode. The transmission data frame includes a preamble 230 for frequency offset estimation and a data area 240. The preamble 230 has a $S_0$ 231, a $S_1$ 232, and a $GI_2$ 233. Here, the $S_0$ 231 and $S_1$ 232 are known data patterns, and the $GI_2$ 233 is guard interval data which is set to be two times a length of the GI 241 in the data area 240.

Frequency estimation efficiency depends on the length of the GI 241 in the data area 240. Thus, in order to improve the frequency estimation efficiency, in the indoor wireless LAN standard IEEE 802.11a, a long training symbol, like the $GI_2$ 233, is prepared so that a length of a GI is set to be two times the GI 241 in the data area 240. However, if a multi-path channel exists in an outdoor environment, intersymbol interference (ISI) is generated in the GI, and thus the $GI_2$ 233 in the preamble 230 is distorted. As a result, the estimation of the frequency offset using the distorted $GI_2$ 233 deteriorates the performance of the transceiver.

Figure 2C:
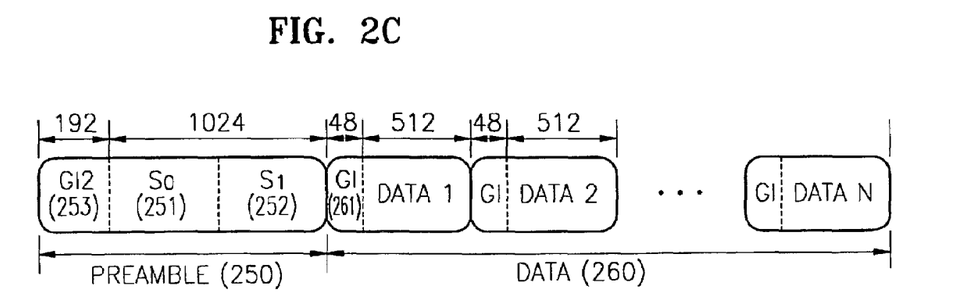
FIG. 2C is a view illustrating a structure of a transmission data frame according to the present invention.

FIG. 2C shows a structure of a transmission data frame according to the present invention. The transmission data frame includes a preamble 250 for frequency offset estimation and a data area 260. The preamble 250 includes a $S_0$ 251, a $S_1$ 252, and a $GI_2$ 253.

A length of the $GI_2$ 253 in a symbol (the preamble 250) for frequency estimation and channel estimation is properly adjusted to a channel environment regardless of a length of a GI 261 in the data area 260. Here, as an example, the length of the GI$_2$ 253 is set to be four times a length of a GI in the transmission data frame shown in FIG. 2A.

Figure 3:
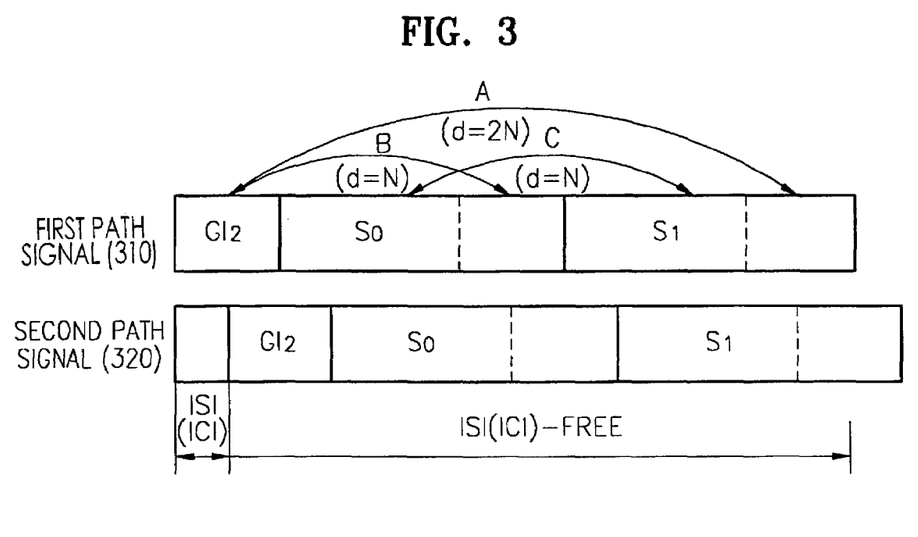
FIG. 3 is a view illustrating characteristics of preamble data of first and second path signals in a time area in a multi-path channel environment.

FIG. 3 shows characteristics of preamble data of first and second path signals 310 and 320 in a time area in a multi-path channel. In other words, in FIG. 3, the second path signal 320 is delayed in the multi-path channel. Here, a S$_0$ is a signal, having the same pattern as a S$_1$, which is generated by performing inverse fast Fourier transform (IFFT) for a signal X$_0$(k)(=X$_1$(k)) in a frequency area. In other words, the S$_0$ is given by equation 1:

$$S_0(n) = \frac{1}{N} \sum_{k=0}^{N-1} X_0(k) e^{j\frac{2\pi nk}{N}}, k = 0, 1, 2, \ldots, N-1 \quad (1)$$

wherein, N is the number of subcarriers.

Referring to FIG. 3, in a preamble structure in the time area, the S$_0$ is equal to the S$_1$, data in the ending part of the S$_1$ is copied and moved by the predetermined number of samples and is located in a GI$_2$ before the S$_0$, and the S$_0$ and the S$_1$ are transmitted after the copied data.

Figure 4:
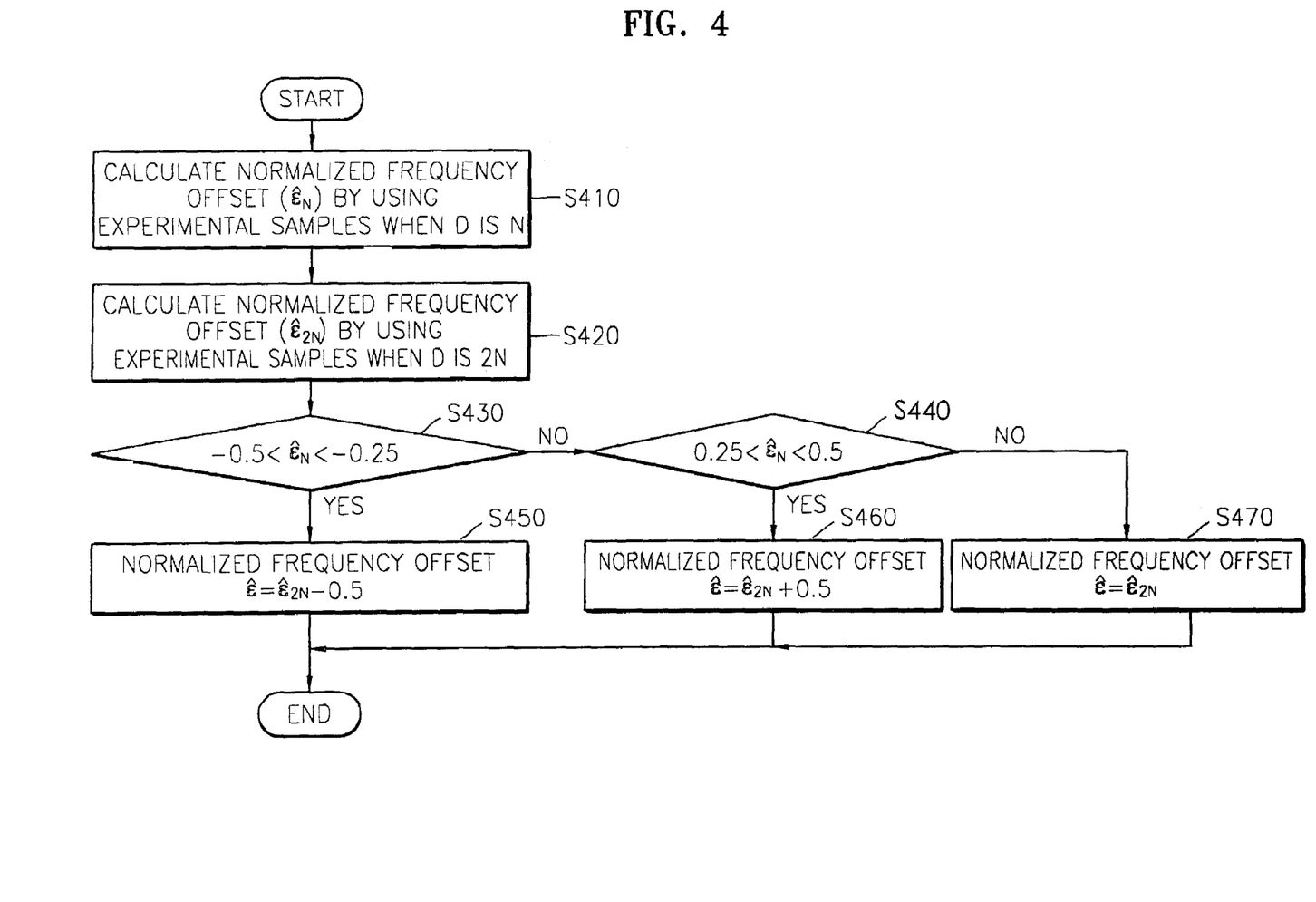
FIG. 4 is a flowchart explaining a method of estimating frequency offset according to the present invention.

FIG. 4 is a flowchart explaining a frequency offset estimating method according to the present invention. First, in step 410, normalized frequency offset $\hat{\epsilon}_N$ is calculated by using several samples when a correlative distance is N. In step 420, normalized frequency offset $\hat{\epsilon}_{2N}$ is calculated by using samples of the GI$_2$ when the correlative distance is 2N. A predetermined value is subtracted from or added to the normalized frequency offset $\hat{\epsilon}_{2N}$ obtained when the correlative distance is 2N, within a range of the normalized frequency offset $\hat{\epsilon}_N$ obtained when correlative distance is N in order to obtain normalized frequency offset. The above-described steps will be described in more detail.

First, step 410 of calculating the normalized frequency offset $\hat{\epsilon}_N$ by using several samples when the correlative distance is N will be described. In general, a frequency offset estimating algorithm in a time area estimates frequency offset by using the amount of phase change between a GI and the ending part of a symbol according to a guard interval based (GIB) method.

The frequency offset estimating algorithm by the GIB method uses many multiplication operations because of the correlation between complex samples. Thus, when hardware is realized, it is advantageous to reduce as many correlative samples as possible. If the frequency offset estimating algorithm is used for a general OFDM symbol, a correlative distance d between the S$_0$ and S$_1$ corresponds to N samples of a length of the general OFDM symbol. Thus, the normalized frequency offset can be estimated within a range of [−0.5, 0.5].

In the frame structure shown in FIG. 3, a correlation B (correlation between the GI$_2$ and the ending part of the S$_0$) and a correlation C (correlation between the S$_0$ and the S$_1$) have the correlative distance d of N, and a correlation A (correlation between the GI$_2$ and the ending part of the S$_1$) has the correlative distance d of 2N. When the correlative distance is d, the normalized frequency offset estimation for a length of a symbol is given by equation 2:

$$\hat{\epsilon}_d = \frac{N}{2\pi d} \tan^{-1}\left\{ \frac{\sum_{i=1}^{L} \text{Im}[y(-i)y \cdot (d-i)]}{\sum_{i=1}^{L} \text{Re}[y(-i)y \cdot (d-i)]} \right\} \quad (2)$$

wherein Re and Im denote real and imaginary numbers, respectively, L denotes the number of samples used in the correlations, and y denotes a signal received in the time area. First, it is supposed that N is 512 and a length of a GI of a general data area is 48 in order to examine frequency offset estimation efficiency.

Figure 5:
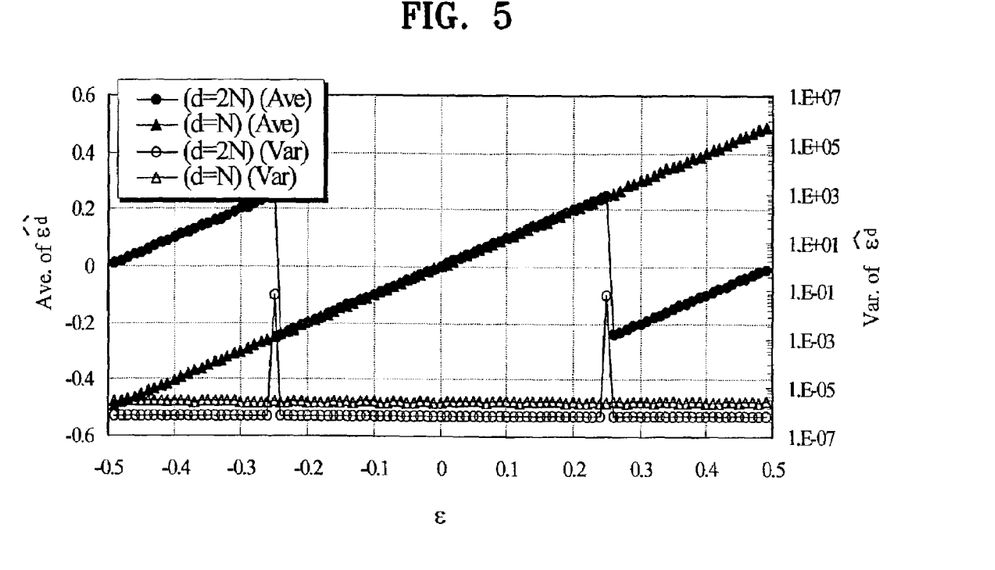
FIG. 5 is a graph showing $\hat{\epsilon}_N$ value estimated from samples in which a correlative distance d is N and $\hat{\epsilon}_{2N}$ value estimated from samples in which the correlative distance d is 2N, in a channel of an AWGN environment when the number L of correlation samples is 2×GI (=96 samples)

FIG. 5 is a graph showing $\hat{\epsilon}_N$ value estimated from samples in which a correlative distance d is N and $\hat{\epsilon}_{2N}$ value estimated from samples in which the correlative distance d is 2N, in a channel of an AWGN environment when the number L of correlation samples is 2×GI (=96 samples).

In FIG. 5, the left lengthwise axis represents frequency estimation average characteristics of $\hat{\epsilon}_d$ and the right lengthwise axis represents frequency estimation distribution characteristics of $\hat{\epsilon}_d$. As shown in FIG. 5, the estimation range of $\hat{\epsilon}_N$ is [−0.5, 0.5] while the estimation range of $\hat{\epsilon}_{2N}$ is [−0.25, 0.25]. However, considering the frequency estimation distribution characteristics, since $\hat{\epsilon}_{2N}$ has a distribution value lower than $\hat{\epsilon}_N$, the frequency offset can be more precisely estimated. In other words, it can be seen that frequency estimation range and frequency estimation efficiency obtained from equation 2 are in a trade-off relation.

Next, in step 420 of calculating the normalized frequency offset $\hat{\epsilon}_{2N}$ when the correlative distance is 2N, the normalized frequency offset $\hat{\epsilon}_{2N}$ is obtained by substituting 2N for the correlative distance d given in equation 2.

After the final frequency offset is obtained by using $\hat{\epsilon}_N$ and $\hat{\epsilon}_{2N}$. In other words, as in equation 3 below, a range of generating $\hat{\epsilon}_{2N}$ is determined by using several samples and the final frequency offset is estimated by using $\hat{\epsilon}_{2N}$ (steps 430 through 470).

$\hat{\epsilon}_N = \hat{\epsilon}_{2N} - 0.5$, if $-0.5 < \hat{\epsilon}_N < -0.25$ $\hat{\epsilon}_N = \hat{\epsilon}_{2N} + 0.5$, if $0.25 < \hat{\epsilon}_N < 0.5$ $\hat{\epsilon}_N = \hat{\epsilon}_{2N}$, elsewhere  (3)

This frequency offset estimating method, as described above, can perform precise frequency estimation by using the small number of samples when fading is not serious and AWGN is dominant. However, when multi-path fading is relatively serious in an outdoor environment or a mobile environment, this frequency offset estimating method, as described above, is not effective. As shown in FIG. 2, in the multi-path channel, the beginning part of the GI$_2$ is seriously distorted due to the ISI and ICI. As a result, the identity with the ending part of the symbol, which is an original transmission property, is greatly lost.

Also, as described above, normalized frequency offset may be estimated by using two symbols, such as the S$_0$ and the S$_1$ having the same pattern, in the preamble. Alternatively, the normalized frequency offset may be estimated by designing a preamble having three symbols, such as the S$_0$, the S$_1$, and the S$_2$ with the same pattern. Therefore, as in the above-described method, a predetermined value is subtract from or added to a normalized offset value calculated when the correlative distance is 3N to more precisely estimate the normalized frequency offset. As a result, more precise frequency offset can be estimated.

If the preamble has three symbols, four areas $GI_2$, $y_0$, $y_1$, and $y_2$ exist in the preamble. In case where the four areas $GI_2$, $y_0$, $y_1$, and $y_2$ are used, frequency estimation range efficiency depends on the correlative distance. In other words, frequency estimation efficiency is in the order of $N[-0.5, 0.5] > 2N[-0.25, 0.25] > 3N[-⅙, ⅙]$, and the accuracy of the frequency estimation is in the order of $3N>2N>N$.

Therefore, when the correlative distance is N, an estimation range is obtained by using several samples, and a predetermined value is subtract from or added to a frequency offset estimation value obtained when the correlative distance is 3N ($GI_2$ and $y_2$). However, for example, if the length of the $GI_2$ is designed to be short, good frequency offset efficiency cannot be achieved from the correlative distance of 3N. Thus, ($y_0$, $y_2$), having the correlative distance of 2N, capable of securing more samples may be used, or ($y_1$, $y_2$) or ($y_2$, $y_3$) having the correlative distance of N may be used, or N, 2N, 3N, etc. may be all used to obtain better frequency offset efficiency.

Figure 6:
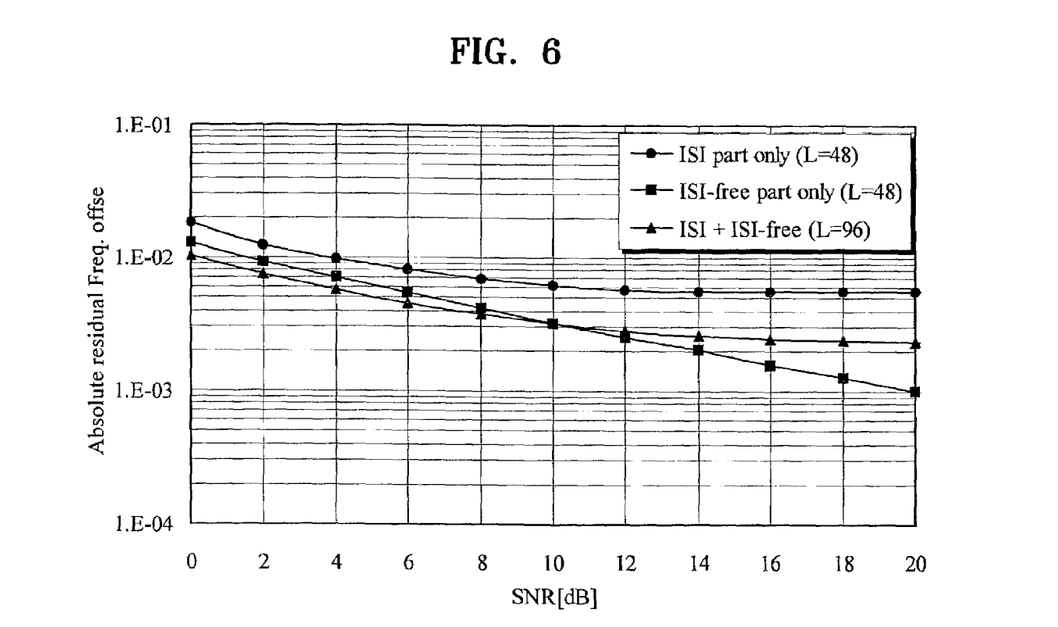
FIG. 6 is a graph illustrating absolute residual frequency offset estimation characteristics.

FIG. 6 shows absolute residual frequency offset estimation characteristics. In other words, in FIG. 6, when correlation is A, in case where channel estimation is performed by using only beginning ISI part (L=48) of the $GI_2$, only ending ISI-free part (L=48) of the $GI_2$, or both parts (L=96), efficiency of absolute residual frequency offset $|\epsilon - \hat{\epsilon}_d|$ is shown.

In the first case, since only the ISI part is used, the absolute residual frequency efficiency is the worst. In the second case, an improvement in the absolute residual frequency offset efficiency is remarkable with an increase in signal-to-noise ratio (SNR), and the most improved absolute residual frequency offset efficiency shows when SNR is 10 dB (decibels) or more. In the third case, when SNR is 10 dB or less, the absolute residual frequency offset efficiency is good. However, when SNR is 16 dB or more, the absolute residual frequency offset efficiency is not improved any more. As described above, when a frequency is estimated by using an ISI area, many samples are required. However, the accuracy of estimating the frequency is limited.

Accordingly, in the present invention, frequency estimation is performed by using data from the ending part of a correlation area to a sample having no ISI except an ISI-free part, i.e., a part in which path is delayed, in consideration of the maximum path delay. Also, a length of a $GI_2$ is designed to be L=4×GI not being restricted to L=2×GI according to the IEEE 802.11 a wireless LAN standard (from the Institute of Electrical and Electronics Engineers), in consideration of a size of a symbol. As a result, much more samples can be extracted from the ending part of the $GI_2$ which is unaffected by the ISI, and the complexity of hardware can be reduced and frequency estimation efficiency can be improved by using the extracted samples.

Figure 7:
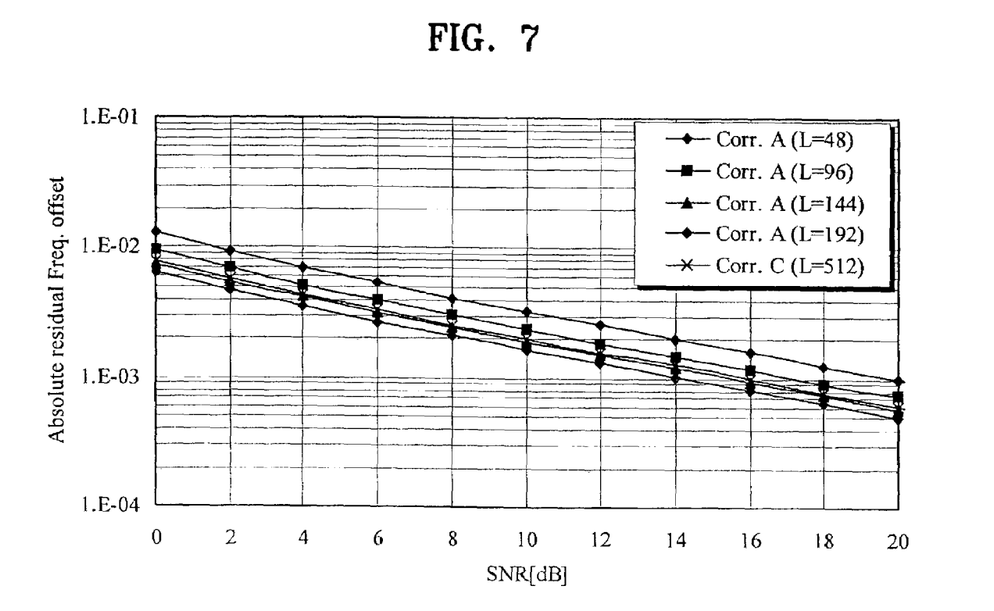
FIG. 7 is a graph illustrating a frequency offset estimation efficiency according to correlation samples in a multi-path channel environment.

FIG. 7 shows frequency offset estimation efficiency according to correlative samples in a multi-path channel. In other words, in FIG. 7, frequency offset estimation efficiency according to the number of correlative samples of an ISI-free part when the correlation is A is compared with frequency offset estimation efficiency obtained when the correlation C corresponds to L=512 samples. It can be seen that the frequency offset estimation efficiency is better when the correlation A in which the correlative distance d is 2N uses L=144 samples than when the correlations C in which the correlative distance d is N uses L=512 samples. Thus, in the present invention, frequency offset estimation is performed by designing the length of $GI_2$ to be 4×GI and using 144 samples except 48 samples which is a length of a beginning GI having ISI. However, in the present invention, the length of the $GI_2$ may vary depending on a channel environment and required frequency offset efficiency not being fixed to 4×GI.

After the frequency is synchronized by performing the frequency offset estimation using a preamble signal in a time area, channel equalization is performed by efficiently using signals $y_0(n)$ and $y_1(n)$, received in the time area, corresponding to transmitted signals $S_0$ and $S_1$ and signals in a frequency area in which FFT was performed. Here, it is supposed that a quasi-static channel, which does not vary for one frame but varies every frame, is used. Thus, accurate channel estimation in the preamble area is important to data reception efficiency in one frame.

The channel equalization uses a general zero forcing (ZF) equalization algorithm and a channel coefficient $\hat{C}_m(k)$ is given by equation 4;

$$\hat{C}_m(k) = \frac{X_m(k)}{Y_m(k)} = \frac{X_m(k)}{X_m(k)H_m(k) + \eta_m(k)} \quad (4)$$

If AWGN $\eta_m(k)$ does not exist, $\hat{C}_m(k)$ becomes $1/H_m(k)$. Thus, the channel coefficient $\hat{C}_m(k)$ can be accurately estimated. However, if random noise $\eta_m(k)$ is added, it is difficult to estimate an accurate channel coefficient. Further, if only Guassian random noise exists without multi-path fading, the operation of an equalizer increase bit error rate (BER).

In the present invention, in order to reduce random noise, an average technique is used in a time area and a reference technique is used in a frequency area.

Figure 8:
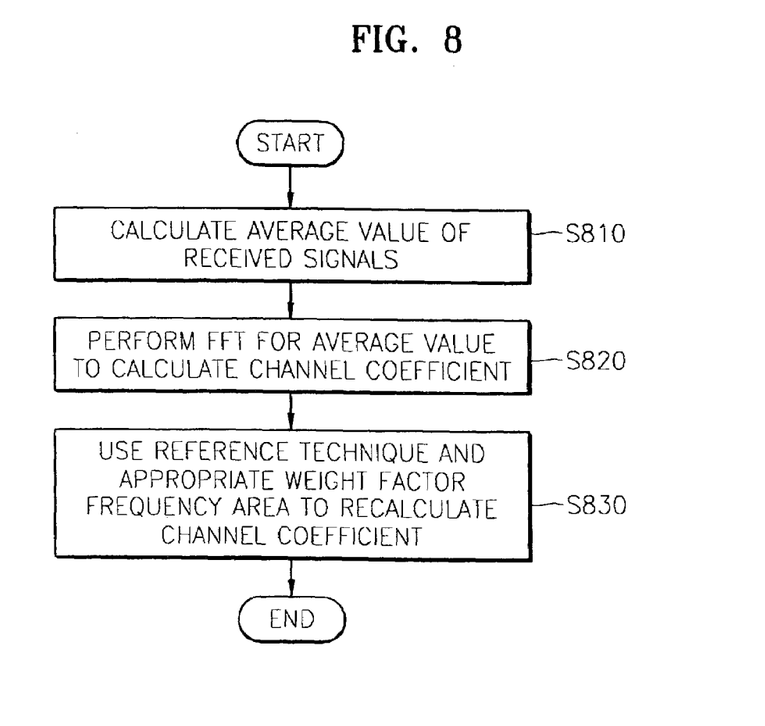
FIG. 8 is a flowchart explaining a channel equalizing method according to the present invention.

FIG. 8 is a flowchart explaining a channel equalizing method according to the present invention. First, in step S810, two signals, which were transmitted in the same known pattern and then received via the wireless channel, are averaged in a time area to obtain an average signal. In step S820, FFT is performed for the average signal to obtain a channel coefficient. The two steps will be described in more detail.

In the average technique, an average signal is measured to reduce AWGN, based on a principle that since transmitted patterns S0 and S1 are the same, received signals $y_0(n)$ and $y_1(n)$ have to be identical. In the present invention, in order to reduce the amount of operation performed in hardware, FFT is not performed on the received signals $y_0(n)$ and $y_1(n)$ for two times. Rather, two symbols $y_0(n)$ and $y_1(n)$ in the time area are averaged to obtain an average signal $Y_{Ave}(n)$ as in equation 5, and then FFT is performed for the average signal $Y_{ave}(n)$ for only one time to obtain a channel coefficient as in equation 6:

$$y_{Ave}(n) = \frac{y_0(n) + y_1(n)}{2} \quad (5)$$

$$\hat{C}_m(k) = \frac{X_0(k)(\text{or } X_1(k))}{Y_{Ave}(k)} \quad (6)$$

wherein, two symbols in a frequency area of a preamble are in a relation of $X_0(k)=X_1(k)$, and $Y_{ave}(k)$ is the average signal in a frequency domain.

In step 830, the channel coefficient is recalculated by using a result obtained when weight is given to a channel coefficient of an adjacent subcarrier and a result obtained when weight is given to a channel coefficient of a current subcarrier.

The reference technique, which is another channel equalizing method capable of reducing AWGN, is represented by equation 7. The reference technique is a channel equalization technique by which random noise in the frequency area is reduced.

$$\tilde{C}_m(k) = \alpha \hat{C}_m(k) + \beta\{\hat{C}_m(k-1) + \hat{C}_m(k+1)\} + \gamma\{\hat{C}_m(k-2) + \hat{C}_m(k+2)\} \quad (7)$$

wherein, $\hat{C}_m(k)$ is the channel coefficient obtained by the reference technique, and weight factors $\alpha$, $\beta$, and $\gamma$ are in relations of $\alpha \geq \beta \geq \gamma$ and $\alpha+2(\beta+\gamma)=1$.

In other words, in the reference technique, weight is given to a channel coefficient of an adjacent subcarrier pilot to refer to a pilot of a current subcarrier so that the inaccuracy of channel estimation due to Gaussian random noise is reduced.

Also, in the above-described channel equalizing method, a received signal $y_2(n)$ for the $S_2$ as well as $y_0(n)$ and $y_1(n)$ is used to obtain an average value, and then the reference technique is used. As a result, more accurate channel estimation can be performed.

Figure 9A:
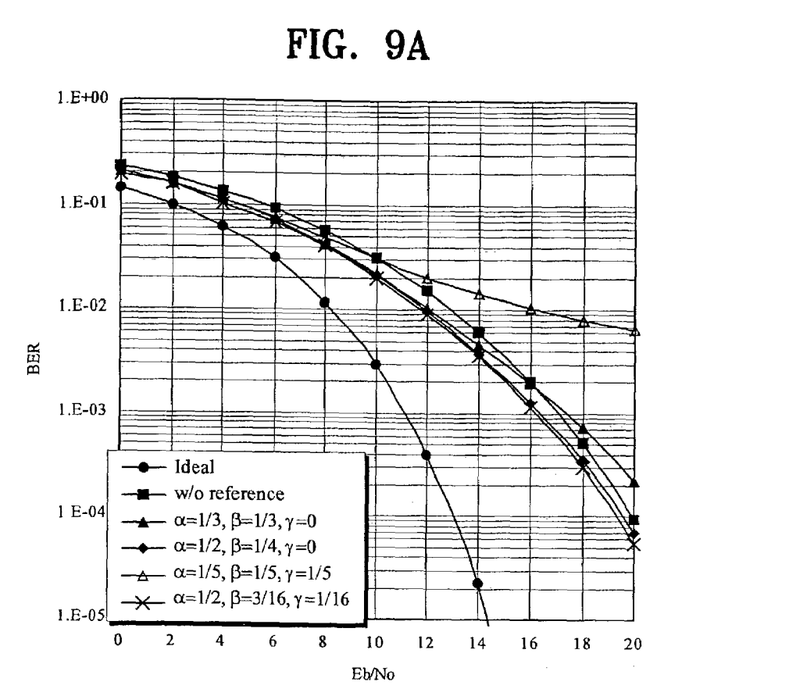
FIG. 9A is a graph illustrating characteristics of bit per rate (BER) in an Additive White Gaussian Noise (AWGN) channel environment when a reference technique is used.

FIG. 9A shows characteristics of BER in an AWGN channel when the reference technique is used.

In the AWGN channel, when an equalizer operates, the deterioration of BER efficiency causes a reduction of about 2.8 dB of $E_b/N_o$ compared to ideal BER efficiency of $10^{-3}$. However, when the reference technique according to the present invention is used, BER efficiency is improved, which results in about 1.7 dB-2.2 dB of $E_b/N_o$ according to a weight factor in BER=$10^{-3}$. Referring to FIG. 9A, it can be seen that in the AWGN channel, among several reference techniques, a reference technique of $\alpha=\beta=\gamma=\frac{1}{5}$, which refers to as many subcarriers as possible, placing the same weight on the subcarriers, is the most efficient.

Figure 9B:
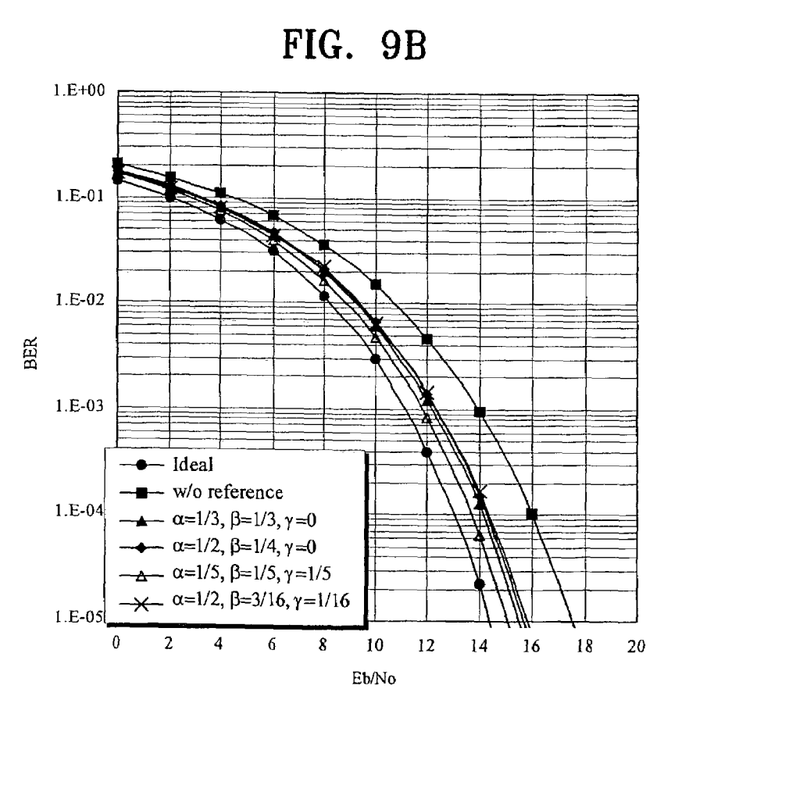
FIG. 9B is a graph illustrating characteristics of BER in a multi-path channel environment when a reference technique is used.

FIG. 9B shows characteristics of BER in a multi-path channel when the reference technique is used. Referring to FIG. 9B, it can be seen that in the multi-path channel, BER efficiency is the worst when the weight factors are in a relation of $\alpha=\beta=\gamma=\frac{1}{5}$. In other words, when a channel deteriorates due to multi-path fading, if excessive weight is placed on a channel estimation value of an adjacent subcarrier pilot to be referred to, BER efficiency is lowered.

In FIG. 9B, it can be seen that BER efficiency improves about 0.4 dB of $E_b/N_o$ in $10^{-3}$ when $\alpha=\frac{1}{2}$, $\beta=\frac{3}{16}$, and $\gamma=\frac{1}{16}$ than when the reference technique is not sed. In a system designed in the present invention, $\alpha$, $\beta$, and $\gamma$ are set to be $\frac{1}{2}$, $\frac{3}{16}$, and $\frac{1}{16}$, respectively, which show excellent operation efficiency in an AWGN channel and a multi-path channel. In the reference technique used in a serious multi-path channel, more improved BER efficiency cannot be expected like in the AWGN channel. However, since an OFDM receiver does not always operate in the serious multi-path channel, Gaussian random noise can be considerably reduced.

Figure 10:
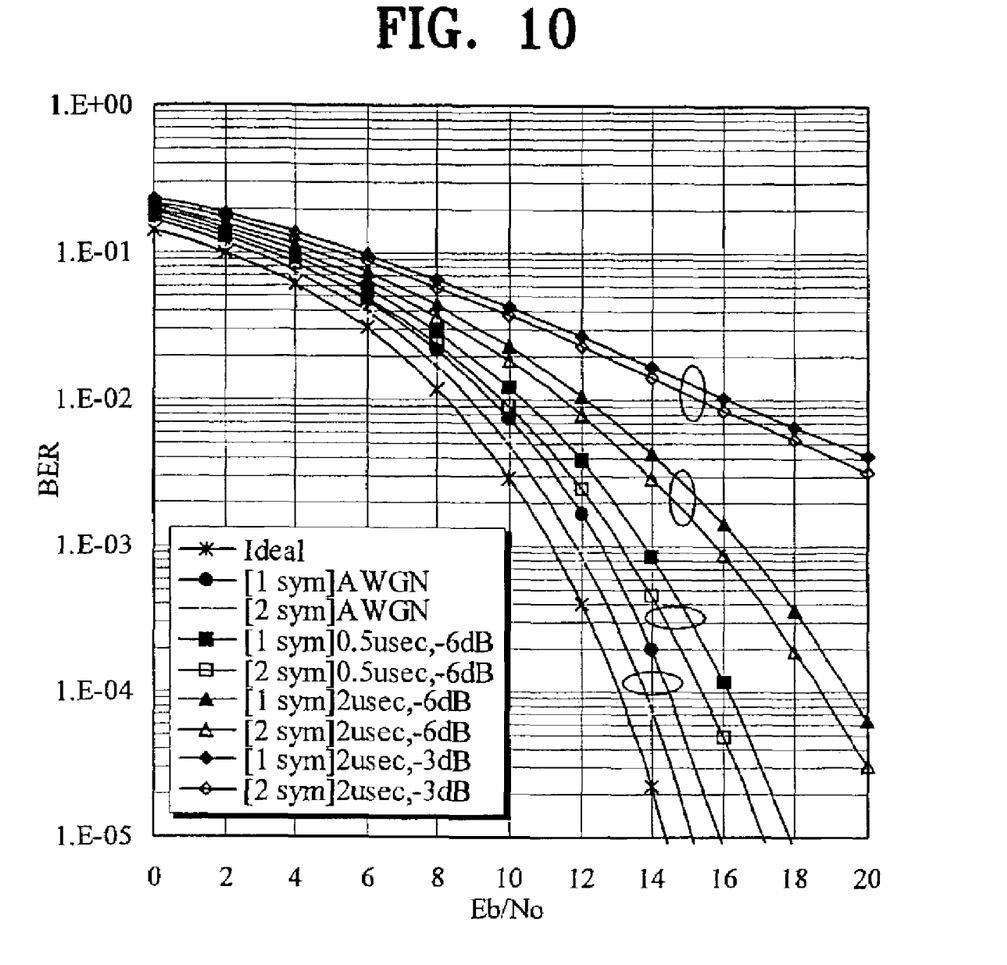
FIG. 10 is a graph illustrating BER efficiency curves of an average technique.

FIG. 10 shows BER efficiency curves of the average technique. In other words, FIG. 10 shows that, in case where relative delay and relative gain of the second path signal vary, a BER characteristic of one symbol when reference equalization is performed by using only one symbol $Y_0(k)$ in several channels and BER characteristics of two symbols when the reference equalization is performed by using $Y_{Ave}(k)$ obtained by the average technique given by equations 5 and 6. In FIG. 9, it can be seen that an efficiency gain $E_b/N_o$ obtained by the average technique is about 0.5 dB-0.7 dB in each channel when BER=$10^{-3}$.

Accordingly, when channel estimation is performed by using the average technique and the reference technique at the same time, the efficiency gain $E_b/N_o$ is about 3 dB in an AWGN channel while the efficiency gain $E_b/N_o$ is about 1 dB in a serious multi-path channel.

As described above, according to the present invention, by using samples of the ending part of a $GI_2$ unaffected by an ISI, desired frequency estimation efficiency can be satisfied with the small number of samples.

Also, when channel equalization is performed, two symbols are averaged in a time area to reduce the accuracy of channel estimation due to Gaussian random noise. In a frequency area, by referring to weight placed on an adjacent subcarrier, a channel equalization coefficient is obtained to efficiently reduce Gaussian random noise. Thus, the present invention is useful to design a frame structure for orthogonal frequency division multiplexing (OFDM) burst transmission.

The present invention can be realized as computer-readable codes in computer-readable recording media. The computer-readable media includes all kinds of recording media in which computer-readable data is stored. The computer-readable media include storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), system memory (read-only memory, random access memory), flash memory, and carrier waves (e.g., transmission via the Internet). Also, the computer-readable media can store and execute computer-readable codes that are distributed in computers connected via a network.

Figure 11:
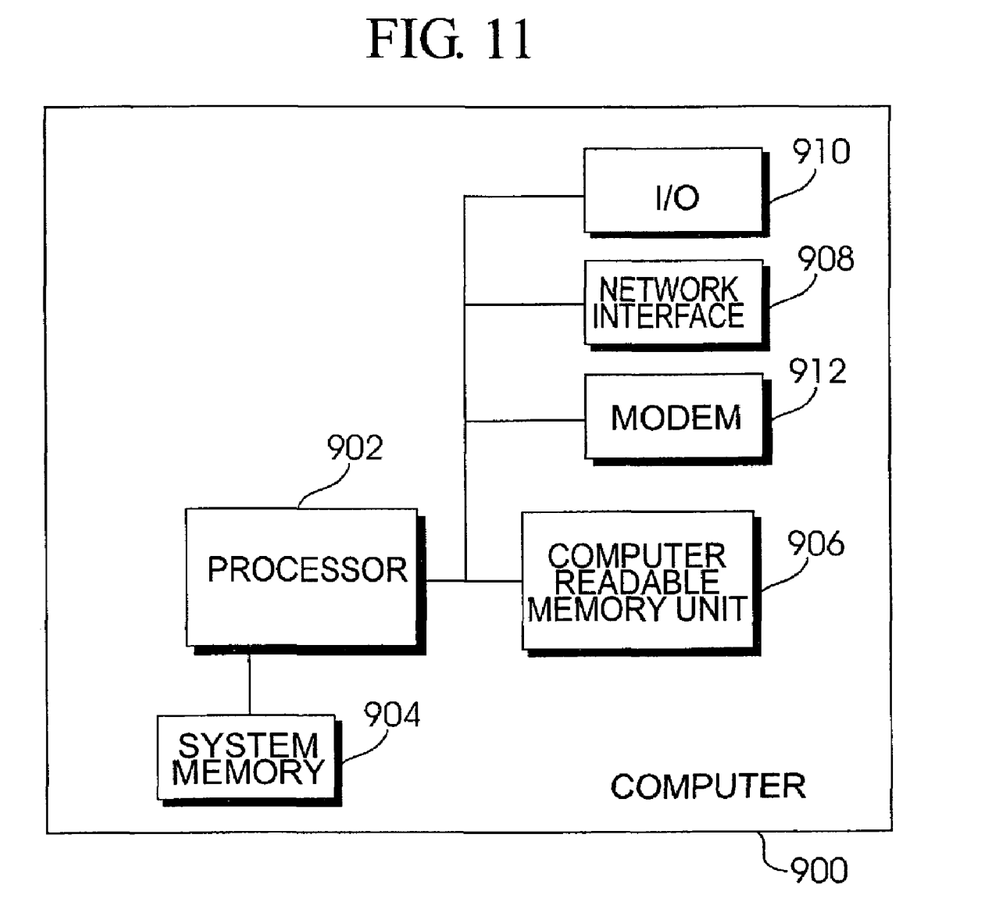
FIG. 11 is an example of a computer that can read computer readable recording media.

An example of a computer that can read computer readable recording media is shown in FIG. 11. The computer 900 includes a processor 902 that controls the computer 900. The processor 900 uses the system memory 904 and a computer readable memory device 906 that includes certain computer readable recording media. A system bus connects the processor 902 to a network interface 908, modem 912 or other interface that accommodates a connection to another computer or network such as the Internet. The system bus may also include an input and output interface 910 that accommodates connection to a variety of other devices.

While this invention has been particularly shown and described with reference to preferred embodiments thereof, it will be understood by those skilled in the art that various changes in form and details may be made therein without departing from the spirit and scope of the invention as defined by the appended claims. Therefore, the above-described embodiments must be considered in a descriptive view not a limited view. The scope of the present invention must be defined by the appended claims not the above-described embodiments, and it must be interpreted that all differences within a range equivalent to the scope of the present invention are included in the present invention.

What is claimed is:

1. A method of estimating frequency offset in an orthogonal frequency division multiplexing system, the method comprising:

calculating a normalized frequency offset for each of a known experimental sample signal when a correlative distance is N subcarriers, and the known experimental sample signal when a correlative distance is 2N subcarriers, where N is a number greater than zero; and subtracting or adding a predetermined value from or to the normalized frequency offset calculated when the correlative distance is 2N, in dependence upon a range of the normalized frequency offset value calculated when the correlative distance is N so as to estimate the frequency offset.

2. The method of claim 1, wherein in the step of calculating normalized frequency offset, the normalized frequency offset is calculated by using the amount of phase change between data of guard interval in a preamble area for frequency offset estimation and channel estimation and data of ending parts of the known experimental sample signals.

3. The method of claim 1, wherein in the step of calculating the normalized frequency offset further comprises calculating a normalized frequency offset for the known experimental sample signal when a correlative distance is 3N subcarriers.

4. The method of claim 3, wherein the step of subtracting or adding the predetermined value from or to normalized frequency offset calculated comprises subtracting or adding a predetermined value from or to the normalized frequency offset calculated when the correlative distance is 3N, in dependence upon a range of the normalized frequency offset value calculated when the correlative distance is N so as to estimate the normalized frequency offset.

5. The method of claim 1, wherein in the step of subtracting or adding the predetermined value from or to the normalized frequency offset calculated, when the frequency offset value calculated from the correlative distance N is within a range of −0.5 to −0.25, 0.5 is subtracted from the frequency offset value calculated when the correlative distance is 2N so as to estimate the frequency offset.

6. The method of claim 1, wherein in the step of subtracting or adding the predetermined value from or to the normalized frequency offset calculated, when the frequency offset value calculated from the correlative distance N is within a range of 0.25 to 0.5, 0.5 is added to the frequency offset value calculated when the correlative distance is 2N so as to estimate the frequency offset.

7. The method of claim 1, wherein in the step of subtracting or adding the predetermined value from or to normalized frequency offset calculated, when the frequency offset value calculated from the correlative distance N is not within the range of −0.5 to −0.25 and the range of 0.25 to 0.5, the frequency offset value calculated when the correlative distance is 2N is used as it is so as to estimate the frequency offset.

8. A method of equalizing a channel in an orthogonal frequency division multiplexing system, the method comprising:
averaging two signals, which are transmitted in the same known pattern and received via a wireless channel, in a time area to obtain an average signal, with the average signal being established by:

$$y_{Ave}(n) = \frac{y_0(n) + y_1(n)}{2}$$

where n=0, 1, . . . , N−1, N is the total number of samples in each signal, $y_0(n)$ and $y_1(n)$ are the two signals, where N is a number greater than zero; and
calculating a channel coefficient by performing fast Fourier transform for the obtained average signal.

9. The method of claim 8, after obtaining the channel coefficient by performing the fast Fourier transform for the obtained average signal, further comprising recalculating a channel coefficient by using a result obtained when weight is given to a channel coefficient of an adjacent subcarrier and a result obtained when weight is given to a channel coefficient of a current subcarrier.

10. The method of claim 9, wherein when recalculating the channel coefficient, the channel coefficient is recalculated by using equation below after calculating the channel coefficient by performing the fast Fourier transform for the obtained average value:

$$\tilde{C}_m(k) = \alpha \hat{C}_m(k) + \beta\{\hat{C}_m(k-1) + \hat{C}_m(k+1)\} + \gamma\{\hat{C}_m(k-2) + \hat{C}_m(k+2)\}$$

wherein, $\hat{C}_m(k)$ denotes the channel coefficient obtained by performing the fast Fourier transform, and weight factors α, β, and γ are in relations of $\alpha \geq \beta \geq \gamma$ and $\alpha + 2(\beta + \gamma) = 1$.

11. The method of claim 10, wherein the weight factors α, β, and γ are all ⅕.

12. The method of claim 10, wherein the weight factor α is ½, the weight factor β is 3/16, and the weight factory γ is 1/16.

13. A computer-readable medium, comprised of a transmission data frame structure encoded on the computer-readable medium and enabling orthogonal frequency division multiplexing burst mode communications in an orthogonal frequency division multiplexing system, wherein a length of a guard interval in a preamble area of the transmission data frame structure for frequency offset estimation and channel estimation varies depending on a channel environment and not being limited in consideration of a size of a data symbol, and only data of ending part of the guard interval in the preamble is used to estimate frequency offset in consideration of intersymbol interference.

14. The computer-readable medium encoded with the transmission data frame structure of claim 13, wherein the length of the guard interval is four times a length of a guard interval of a transmission data frame used in an existing orthogonal frequency division multiplexing burst mode.

15. The computer-readable medium encoded with the transmission data frame structure of claim 13, wherein the length of the guard interval is at least about four times a length of a guard interval of a transmission data frame used in an existing orthogonal frequency division multiplexing burst mode.

16. A computer-readable recording medium encoded with a computer program for executing a frequency offset estimating method performed in an orthogonal frequency division multiplexing system in a computer is recorded, the frequency offset estimating method comprising:
calculating a normalized frequency offset for each of a known experimental sample signal in which a correlative distance is N subcarriers, and the known experimental sample signal in which the correlative distance is 2N subcarriers, where N is a number greater than zero; and
subtracting or adding a predetermined value from or to the normalized frequency offset calculated when the correlative distance is 2N in dependence upon a range of the normalized frequency offset calculated when the correlative distance is N so as to estimate normalized frequency offset.

17. A computer-readable recording medium encoded with a computer program for executing a channel equalizing method performed in an orthogonal frequency division multiplexing system in a computer is recorded, the channel equalizing method comprising:
averaging two signals, which are transmitted in the same known pattern and received via a wireless channel, in a time area to obtain an average signal; and
calculating a channel coefficient by performing fast Fourier transform for the obtained average signal.

18. The method of claim 17, comprised of subtracting or adding a predetermined value from or to the normalized frequency offset calculated when a correlative distance is 2N, in dependence upon a range of a normalized frequency offset value calculated when the correlative distance, where N is a number greater than zero is N so as to estimate the frequency offset, wherein in the step of subtracting or adding the predetermined value from or to the normalized frequency offset calculated, when the frequency offset value calculated from the correlative distance N is within a range of −0.5 to −0.25, 0.5 is subtracted from the frequency offset value calculated when the correlative distance is 2N so as to estimate the frequency offset.

19. A computer-readable medium having stored thereon a data structure comprising:

a first field containing data representing a calculating of normalized frequency offset for each of a known experimental sample signal when a correlative distance is N subcarriers, and the known experimental sample signal when the correlative distance is 2N subcarriers, where N is a number greater than zero; and a second field containing data representing a changing of a predetermined value from the normalized frequency offset calculated when the correlative distance is 2N in dependence upon a range of the normalized frequency offset calculated when the correlative distance is N accommodating to estimate normalized frequency offset.

20. The computer-readable medium having stored thereon a data structure of claim 19, further comprising:

a third field containing data representing averaging two signals, which are transmitted in the same known pattern and received via a wireless channel, in a time area to obtain an average signal; and a fourth field containing data representing calculating a channel coefficient by performing fast Fourier transform for the obtained average signal.

21. A method, comprising:

calculating normalized frequency offset for each of a known experimental sample signal when a correlative distance is N subcarriers, and the known experimental sample signal when a correlative distance is 2N subcarriers, where N is a number greater than zeso;

changing by a predetermined value of the normalized frequency offset calculated when the correlative distance is 2N, in dependence upon a range of the normalized frequency offset value calculated when the correlative distance is N so as to estimate the frequency offset;

averaging two signals, which are transmitted in the same known pattern and received via a wireless channel, in a time area to obtain an average signal; and calculating a channel coefficient by performing fast Fourier transform for the obtained average signal.

22. The method of claim 21, wherein in the step of calculating normalized frequency offset, the normalized frequency offset is calculated by using the amount of phase change between data of guard interval in a preamble area for frequency offset estimation and channel estimation and data of ending parts of the known experimental sample signals.

23. The method of claim 22, wherein the step of calculating normalized frequency offset further comprises a calculating normalized frequency offset for the known experimental sample signal when the correlative distance is 3N subcarriers.

24. The method of claim 23, wherein the step of changing by a predetermined value of a normalized frequency offset comprises:

changing by a predetermined value, the normalized frequency offset calculated when the correlative distance is 3N, in dependence upon the range of the normalized frequency offset value calculated when the correlative distance is N so as to estimate the normalized frequency offset.

25. The method of claim 24, wherein in the step of changing by a predetermined value of a normalized frequency offset, when the frequency offset value calculated from the correlative distance N is within a range of approximately −0.5 to −0.25, approximately 0.5 is subtracted from the frequency offset value calculated when the correlative distance is 2N to accommodate estimating of the frequency offset.

26. The method of claim 25, wherein in the step of changing by a predetermined value of a normalized frequency offset, when the frequency offset value calculated from the correlative distance N is within a range of approximately 0.25 to approximately 0.5, approximately 0.5 is added to the frequency offset value calculated when the correlative distance is 2N so as to estimate the frequency offset.

27. The method of claim 21, wherein in the step of changing by a predetermined value of a normalized frequency offset, when the frequency offset value calculated from the correlative distance N is not within the range of about −0.5 to about −0.25 and the range of about 0.25 to about 0.5, the frequency offset value calculated when the correlative distance is 2N is used as it is to accommodate an estimate of the frequency offset.

28. The method of claim 27, after obtaining the channel coefficient by performing the fast Fourier transform for the obtained average signal, further comprising recalculating a channel coefficient by using a result obtained when weight is given to a channel coefficient of an adjacent subcarrier and a result obtained when weight is given to a channel coefficient of a current subcarrier.

29. The method of claim 26, wherein when recalculating the channel coefficient, the channel coefficient is recalculated by using equation below after calculating the channel coefficient by performing the fast Fourier transform on the obtained average signal:

$$\bar{C}_m(k)=\alpha \hat{C}_m(k)+\beta\{\hat{C}_m(k-1)+\hat{C}_m(k+1)\}+\gamma\{\hat{C}_m(k-2)+\hat{C}_m(k+2)\}$$

wherein, $\hat{C}_m(k)$ denotes the channel coefficient obtained by performing the fast Fourier transform, and weight factors $\alpha$, $\beta$, and $\gamma$ are in relations of $\alpha \geqq \beta \geqq \gamma$ and $\alpha+2(\beta+\gamma)=1$.

30. The method of claim 29, wherein the weight factors $\alpha$, $\beta$, and $\gamma$ are all about $\frac{1}{5}$.

31. The method of claim 29, wherein the weight factor $\alpha$ is about $\frac{1}{2}$, the weight factor $\beta$ is about $\frac{3}{16}$, and the weight factory $\gamma$ is about $\frac{1}{16}$.

32. The method of claim 31, further comprising of a transmission data frame used in a orthogonal frequency division multiplexing burst mode system including a length of a guard interval in a preamble area for frequency offset estimation and channel estimation varies depending on a channel environment not being limited in consideration of a size of a data symbol, and only data of ending part of the guard interval in the preamble is used to estimate frequency offset in consideration of intersymbol interference.

33. The method of claim 32, comprised of subtracting or adding a predetermined value from or to normalized frequency offset calculated when the correlative distance is 2N, in dependence upon a range of a normalized frequency offset value calculated when the correlative distance is N so as to estimate the frequency offset, wherein in the step of subtracting or adding the predetermined value from or to the normalized frequency offset calculated, when the frequency offset value calculated from the correlative distance N is within a range of 0.25 to 0.5, 0.5 is added to the frequency offset value calculated when the correlative distance is 2N so as to estimate the frequency offset.

34. The method of claim 32, wherein in the step of subtracting or adding the predetermined value from or to normalized frequency offset calculated, when the frequency offset value calculated from the correlative distance N is within a range of 0.25 to 0.5, 0.5 is added to the frequency offset value calculated when the correlative distance is 2N so as to estimate the frequency offset.

* * * * *